United States Patent [19]
Hofmann

[11] 3,808,361
[45] Apr. 30, 1974

[54] METHOD AND DEVICE FOR LINE-BY-LINE PHOTOGRAPHING OF AN OBJECT

[75] Inventor: Otto Hofmann, Kirchstockach, Germany

[73] Assignee: Messerschmitt-Bolkow-Blohm Gesellschaft mit beschrankter Haftung, Munich, Germany

[22] Filed: Feb. 2, 1972

[21] Appl. No.: 222,972

[30] Foreign Application Priority Data
Feb. 10, 1971  Germany............................ 2106268

[52] U.S. Cl. .............................................. 178/7.2
[51] Int. Cl. ............................................. H04n 7/00
[58] Field of Search .............. 178/7.6, 6.7, 7.85, 7.2

[56] References Cited
UNITED STATES PATENTS

| | | | |
|---|---|---|---|
| 3,371,161 | 2/1968 | Crovella............................ | 178/7.2 |
| 3,678,195 | 7/1972 | Dillenburger...................... | 178/7.2 |
| 3,583,802 | 6/1971 | Calinescu.......................... | 178/7.2 X |
| 3,240,942 | 4/1966 | Birnbaum et al. ................. | 178/6.8 X |
| 3,450,455 | 6/1969 | Landre............................... | 178/7.6 X |
| 3,511,927 | 5/1970 | Lehr................................... | 178/6.7 R |

Primary Examiner—Paul J. Henon
Assistant Examiner—Paul R. Woods
Attorney, Agent, or Firm—McGlew and Tuttle

[57] ABSTRACT

The object is photographed from aboard an attitude-stabilized flying body flying over the object, by line-by-line reproduction of the object, using immovable mechanical parts, on the photosensitive screen of electron beam scanning camera tubes. An objective reproduces the object to be photographed in an image plane, and one line of the reproduced object is masked out and analyzed into plural line segments. The line segments are reproduced on the photosensitive screens of respective camera tubes. The device includes plural mirror strips extending crosswise of the flight direction of the flying body and arranged in sequence without any gap therebetween. The normals or perpendiculars to these mirror strips have different directions, and the strips mask out only one line from the overall picture, in several partial segments. A converging lens system reproduces the segments on the photosensitive screens of respective camera tubes, such as Vidicons. A light diverging device may be positioned in the optical path to fan out the light radiating through the same into several spectral ranges to provide color pictures. Each mirror strip is applied on an area of a respective prism in such a way that the longer side coincides with the edge of the prism.

7 Claims, 8 Drawing Figures

SPECTRUM RANGES

METHOD AND DEVICE FOR LINE-BY-LINE PHOTOGRAPHING OF AN OBJECT

FIELD OF THE INVENTION

This invention relates to a method and device for photographing an object from aboard an attitude-stabilized flying body flying over the object, by line-by-line reproduction of the object, using non-movable mechanical parts, on a photosensitive screen of a camera tube, and more particularly, to an improved and simplified method and device for effecting such photographing.

BACKGROUND OF THE PRIOR ART

According to the presently known state of the art, there are, in principle, three possibilities for photographing, for example from aboard a satellite flying over the earth, and area of the earth's surface. One possibility is to photograph the area in a snapshot with a photographic camera, after which the developed picture is scanned point by point and the scanning pulses, caused by the differences in brightness, are transmitted, possibly after storage, to a receiving station on the earth.

In a second possibility, instead of snapshot photographing the entire area, the area may be scanned line-by-line, and this can be effected, for example, with the aid of a rotating mirror which, during its rotation, reproduces, each time, one line of the area to be photographed, progressively point by point on a photosensor. During the time the satellite flies over the area to be photographed, the entire area is reproduced in this manner.

The first two possibilities or methods have the disadvantage that mechanically moving parts are used for photographing the object, the first case requiring movement of the shutter of the camera and the second case requiring rotation of a mirror. Apart from the mechanical wear, the rotationally movable parts must be subjected to a special treatment because of the extreme pressure and temperature conditions prevailing in the upper atmosphere or in outer space. This presupposes a costly precision mechanical construction of the bearing parts. For these reasons, such systems are prone to trouble, and may shorten appreciably the useful mission time of a satellite.

Mechanically moving parts can be avoided in accordance with a proposal by C.J. Swet, in "Line Scan Television for Earth Observation Satellites," published by The Johns Hopkins University, Applied Physics Laboratory, TG 853, 1966. In accordance with this proposal, the line of the object, reproduced by a spherical lens, is reproduced by a row of glass fibers arranged side-by-side. The reproduction is produced on the photosensitive screen of a camera tube, so that the line is composed of single screen elements with a side length which approximately corresponds to the diameter of the photoconductor fibers. In order to attain, with this method and from aboard a satellite about 900 km above the earth's surface, a power of resolution of 50–60 m, which more or less corresponds to that of the pictures taken during the Apollo flights, each individual screen element of the line must have a side length of about $20\mu$. For an area of the earth's surface to be photographed, having a width of about 150 km, this means that approximately 2,500 photoconductor fibers are necessary for one line.

Ordered photoconductor fibers with the requisite or even smaller diameters are difficult to produce, however, so that the power of resolution attainable with this photography system is limited. Most importantly, however, the correlation of the individual screen elements of the picture line, and of the screen elements of the photosensitive screen of the camera tube, presents considerable difficulties due to the photoconductor fibers, for example, the adjustment of the entire system. In addition, the assembly of such an optical system is made very difficult due to the fact that the photoconductor fibers are very sensitive to impact and shock effects.

SUMMARY OF THE INVENTION

The objective of the invention is to provide a method and device for picture-taking without the use of mechanically moved parts, and using optical systems which are easy to produce and easy to adjust, for the reproduction of the picture line on the photosensitive screen of a camera tube while, at the same time, providing for adjustment of the power of resolution within wide limits. For this purpose, in accordance with the invention, from the image plane of an objective reproducing the object to be photographed, one line is masked out, is analyzed into several line segments, and each of these line segments is reproduced on a photosensitive screen of a camera tube.

The device or apparatus for performing the method, and usable aboard an attitude-stabilized flying body flying over the object, to effect line-by-line reproduction of the object, with non-movable mechanical parts, on a photosensitive screen of a camera tube, includes an objective reproducing the object to be photographed in an image plane. There are arranged, in this image plane, several mirror strips, extending transversely or crosswise to the flight direction of the flying body, and arranged in gapless continuity with each other. The normals or perpendiculars of these mirror strips have different directions, and the strips mask out, from the total picture, only one line in all, and in several partial line segments. A converging lens system is associated with the mirror strips for reproducing the several partial line segments on the photosensitive screens of respective camera tubes.

The special feature of dividing the picture line into several partial segments, each of which is reproduced by a mirror strip on the photosensitive screen of a respective camera tube, has several advantages. As one advantage, the power of resolution and the picture angle can be adjusted, within wide limits, by corresponding dimensioning and number of the individual mirror strips and the respective lens systems As another advantage, the screens of the camera tubes may be selected to be relatively small, for example one inch, whereby the electronic expense for the deflection systems of the individual camera tubes is maintained low. A further advantage is that the arrangement of the individual mirror strips with the respective mirror normals or perpendiculars extending in different respective directions, permits additionally a favorable arrangement in space of the individual camera tubes.

An outstanding advantageous feature of the invention is that, while avoiding mechanically moved parts, only simple, known and technologically controllable means are used for the entire system. Thereby, the costs for the construction of a picture-taking system can be reduced considerably, in addition to which the correlation and adjustment components used in the system are very simple. Furthermore, the simplicity of design results in the picture-taking system being less prone to trouble, even under more difficult environmental conditions than is the case with known systems, so that the life is increased accordingly. In view of this, for example, the useful mission time of a satellite, equipped with a picture-taking system embodying the invention, can be taken to be longer than usual up to now.

With a device embodying the invention, there is also obtained the easily realized possibility of taking color pictures of the object without requiring additional camera tubes. For this purpose, the converging lens system, which reproduces a mirror strip on the photosensitive screen of a camera tube, comprises a device which fans out, or disperses, the light radiating therethrough into several spectral ranges. As the individual spectral ranges are thus reproduced on a single screen, they can be scanned either by one electron beam successively or by several electron beams simultaneously.

Because of the line-by-line reproduction of the object to be photographed, and the resulting orthoperspective, the invention picture-taking system is suitable, in contrast to the central perspective in conventional photographic systems, additionally for stereophotography from great heights. For this purpose, two picture-taking systems embodying the invention are needed, each reproducing the area to be photographed at a different angle. The depth perception capacity, referred to also as "relief," of the stereo picture then depends only on the angle between the respective optical axes of the two picture-taking systems, and not, as in conventional methods, on the picture format, the picture angle, the flight height, or the overlap ratio of the two pictures taken.

An object of the invention is to provide an improved method for photographing an object from aboard an attitude-stabilized flying body flying over the object.

Another object of the invention is to provide improved apparatus for photographing an object from aboard an attitude-stabilized flying body flying over the object.

A further object of the invention is to provide such a method and apparatus in which any mechanical parts used are non-movable.

Another object of the invention is to provide such a method and apparatus in which the object to be photographed is reproduced in an image plane by an objective, one line of the reproduced object in the image plane is masked out, the masked out line is analyzed into plural line segments, and each line segment is reproduced on the photosensitive screen of a respective camera tube.

A further object of the invention is to provide such a method and apparatus capable of taking color pictures and stereo pictures.

For an understanding of the principles of the invention, reference is made to the following description of typical embodiments thereof as illustrated in the accompanying drawing.

DESCRIPTION OF THE PREFERRED EMBODIMENTS

Figure 1:
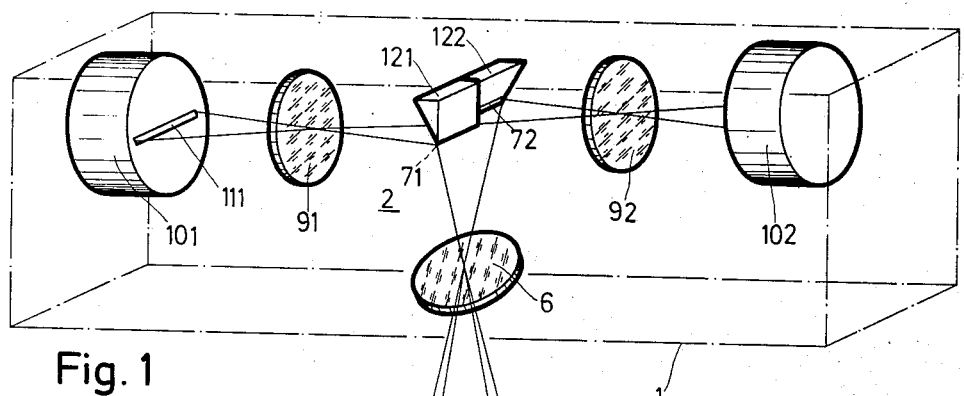
FIG. 1 is a somewhat schematic perspective view illustrating the basic principles of the invention as used for line-by-line photographing of an area of the earth's surface utilizing two mirror strips and from aboard a satellite.
Figure 3:
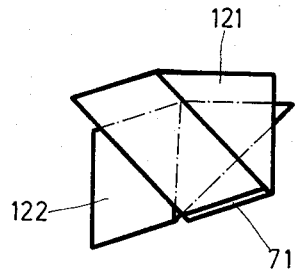
FIG. 3 is a perspective representation of the arrangement of the two mirror strips.
Figure 2:
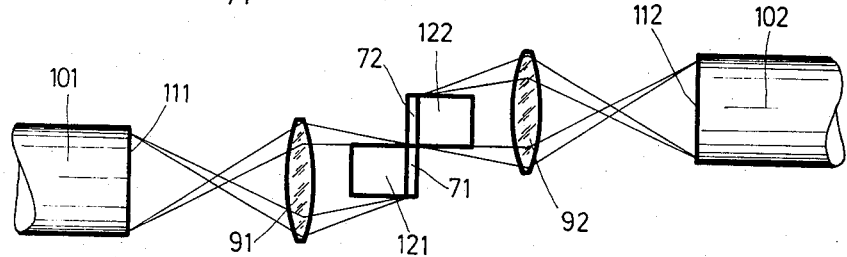
FIG. 2 is a front elevation view of the system shown in FIG. 1.

Referring first to FIGS. 1, 2 and 3, an attitude-stabilized satellite 1 is indicated in dash-dot lines in FIG. 1 and carries a picture-taking system 2 which photographs, of the earth's surface 3, an area of the width $b$ in individual lines or strips 4. The flight direction of satellite 1 is indicated by its subtrack 5 on the earth's surface 3. In the picture-taking system 2, the light eminating from line 4 is focused by an objective 6 in its image plane and onto two mirror strips 71 and 72, only the marginal rays 8 traversing the objective being indicated in FIG. 1, for simplicity. Specifically, the image of a partial segment 41 of line 4 is focused onto mirror strip 71, and the image of partial segment 42 of line 4 is focused onto mirror strip 72. Mirror strips 71 and 72 have a length and a width corresponding to the image line in the image plane of objective 6, and are so aligned that, with the interposition of a respective converging lens 91 and 92 for each segment 41 and 42, the images of segments 41 and 42 are reproduced on the photosensitive screens of respective camera tubes, illustrated as Vidicons 101 and 102, respectively, in respective lines 111 and 112.

The individual lines 111 and 112 are scanned, in a known manner, by the electron beams of Vidicons 101 and 102, with the voltage pulses occurring during the scanning, due to the brightness differences, being transmitted to a receiving station, which has not been shown, on the terrestrial surface 3 after storage. The overall picture of the area is produced in a suitable evaluating device on the earth by fitting together the individual image lines 4 photographed during the overflight of the area by satellite 1.

The production of mirror strips 71 and 72 is effected by applying them, for example by vapor deposition of a reflecting metal, on respective prisms 121 and 122, in a manner such that the long side of each mirror strip coincides with the edge of the respective prism. Prisms 121 and 122 are fitted together without a gap therebetween, and are so offset, relatively to each other, that mirror strips 71 and 72 just pickup the line 4 of the area to be photographed and that the deflected light ray is not interfered with by adjacent prism areas in the free ray path. This is clarified in FIGS. 2 and 3.

Figure 4:
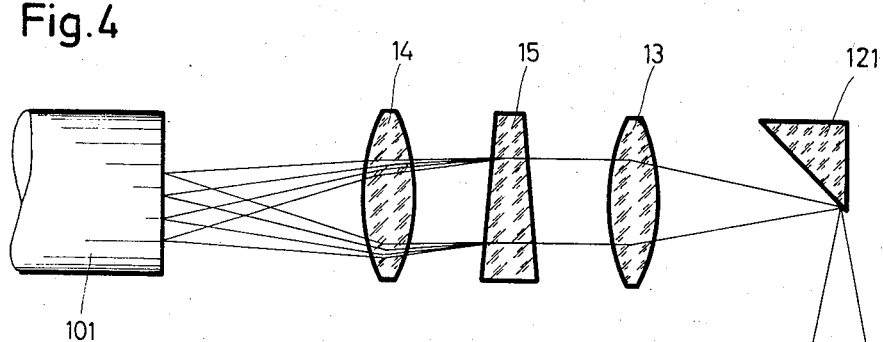
FIG. 4 is a schematic illustration of the light ray path associated with a single mirror strip, as used to provide a colored photograph.

As shown in FIG. 4, the picture-taking system 2 can be used also for color photography of the area to be photographed, if the converging lenses 91 and 92 of FIGS. 1 and 2 are replaced by two converging lenses 13 and 14 each producing a parallel ray path, and by a dispersion wedge 15 arranged between lenses 13 and 14. By dispersion wedge 15, the light originating from line 4 is fanned out spectrally and is scanned in several spectral ranges, each coordinated with one line on the photosensitive screen of the camera tube. For light in the visible and near infrared range, four spectral ranges I to IV have proved favorable. Spectral range I is approximately between 0.5 and 0.6$\mu$, spectral range II is approximately 0.6 to 0.7$\mu$, spectral range III is approximately 0.7 to 0.85$\mu$, and spectral range IV is approximately between 0.85 and 1.0$\mu$.

Figure 6:
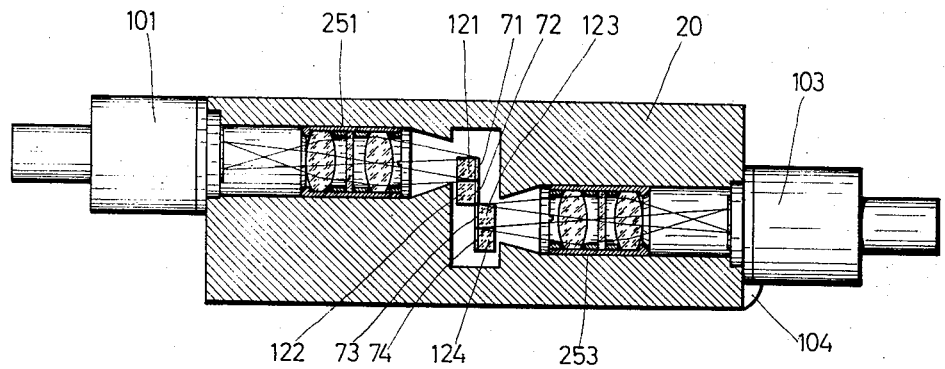
FIG. 6 is a sectional view taken along the line VI—VI of FIG. 5.
Figure 5:
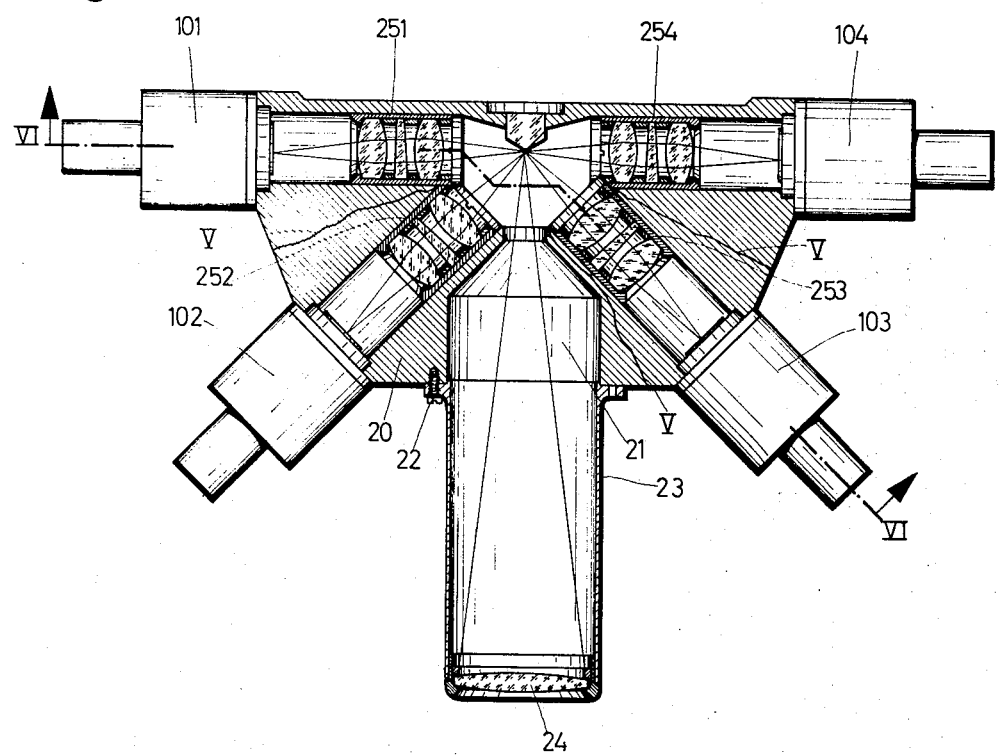
FIG. 5 is a sectional view of a picture-taking system embodying the invention and using four camera tubes.

FIGS. 5 and 6 illustrate, in sectional plan and in sectional elevation, a device embodying the invention for color photography in the mentioned four spectral ranges and using four camera tubes with a division of the picture line into four partial segments. A metal block 20 has a cylindrical recess 21 formed therein and into which is connected an objective tube 23 secured to block 20 by screws 22. Objective tube 23 carries a converging lens 24 which, of course, may be replaced by an objective consisting of several lenses. Converging lens 24, reproducing the area overflown by satellite 1, focuses line 4 of the area onto mirror strips 71 to 74 applied on respective prisms 121 to 124. Each mirror strip has associated therewith, as previously mentioned, one of the Vidicons 101 to 104. These Vidicons are arranged offset relative to each other as shown in FIG. 5 by the individual partial sections, namely, the sectional lines V, and in FIG. 6, so that an optimum utilization of the space results.

Figure 7:
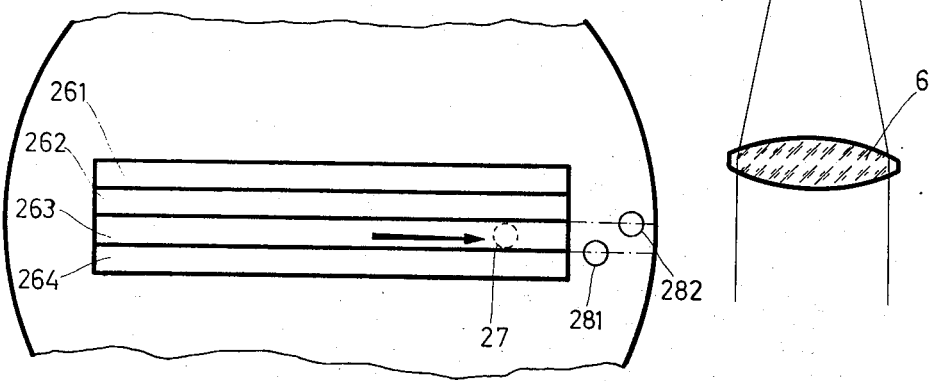
FIG. 7 is a partial front elevation view of the photosensitive screen of a camera tube with a schematic representation of a scanning operation involving four spectral ranges.

The light beam deflected by mirror strips 71 to 74 is fanned out spectrally, in the above mentioned lens systems 251 to 254, and reproduced on the photosensitive screens of respective Videcons 101 to 104. The mentioned four spectral ranges I to IV thus can be represented in four lines 261 to 264, as shown in FIG. 7. In each Vidicon 101 to 104, the four lines 261 to 264 are scanned successively by an electron beam 27, or the lines may be scanned simultaneously by four electron beams, which latter arrangement has not been shown.

During scanning of the several lines 261–264 by the electron beam 27, the respective photosensitive screens of the Vidicons 101–104 are discharged point by point. The resultant current pulses form the video signals. In this connection see, for example, Encyclopaedic Dictionary of Physics, Pergamon Press Ltd., Oxford/London/New York/Paris, 1962, Volume 7, pages 625-626 under "Vidicon Tube." As mentioned, the video signals are stored and then serially transmitted, for example, to a station on the earth and there processed further to obtain the full image.

To obtain an exact correlation of the electron beam 27 and of the individual spectral lines 261 to 264 during the scanning process, electron beam 27 scans a region extending beyond the individual lines 261 to 264. In so doing, the electron beam passes successively through two circular scanning marks 281 and 282, for example two luminous points projected on the photosensitive screen, which are arranged symmetrically with the lower and upper limits of a spectral line, such as the line 263. At symmetrical correlation, the occurring voltage pulses will have the same magnitude and form. If, due to an error of no specific interest in the present instance, electron beam 27 is no longer correlated exactly symmetrically with one of the spectral lines 261 to 264 during scanning, then the correlation between the spectral lines and the electron beam is restored by a control (not shown) actuated by the voltage pulses resulting upon scanning of the scanning marks 281 and 282. Such a control unit, which forms no part of the present invention, is known per se and, for an equivalent case, namely the scanning of the position of the indicator in a measuring instrument within a control circuit, it is described in U. S. Pat. No. 3,363,148, being shown particularly in FIG. 2. The signals from the control unit influence, in the present invention, the vertical deflection of the electron beam 27.

Figure 8:
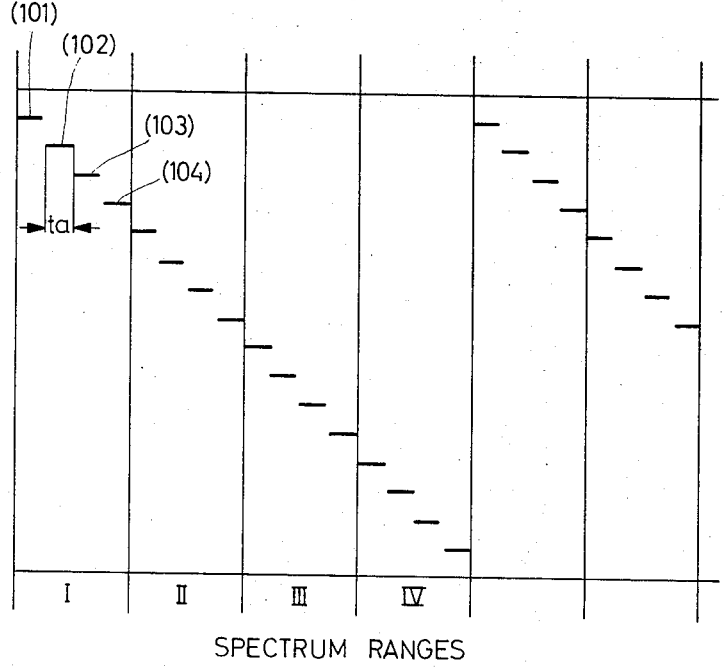
FIG. 8 is a graphical illustration of the time and spectral correlation for color photography using four camera tubes in the invention device.

To reproduce the entire line on the four screens of the Vidicons 101 to 104, a time and spectral correlation of the scanning must be established by the individual Vidicons 101 to 104. An arrangement for this is graphically illustrated in FIG. 8. In FIG. 8, each of the four spectral ranges I to IV is scanned successively by each Vidicon 101 to 104 during the scanning time $t_a$, the respective Vidicons being indicated by the numbers in parenthesis in FIG. 8. This is obtainable, for example, by means of a 16-bit counter, which controls the different deflection coils of Vidicons 101–104 in the prescribed succession. Thus, for example, for a scanning time $t_a$, of 25$\mu$s, a line of the object is scanned in all four spectral ranges during 4 milliseconds.

The embodiment of the invention for reproducing a line of an object in four partial segments by four Vidicons has the particular advantage that Vidicons with a small screen, for example a 1 inch screen, can be used, whereby the electronic expenditure for the deflection of the electron scanning beam 27 is low. In order that all four spectral ranges I – IV can be scanned with the Vidicon, the spectral sensitivity of the photosensitive screen must extend from approximately 0.4 to 1.1$\mu$, and this is possible with the presently available silicon screens. The electron scanning system also can be simple for the reason that less than the entire picture size of the photosensitive screen is utilized. This means, for a 1 inch Vidicon, a picture size of 9.6 × 12.8 mm, but only a narrow strip of a length of about 12 mm and a width of 0.01 mm per spectral range.

Taking as the power of resolution of the silicon screen 50 lines per millimeter, a satellite flying over the earth's surface at a height of 900 km, for example, will reproduce an area 160 km wide with a power of resolution of ca. 66 m if the objective 6 has a focal length of 270 mm and a diameter of about 66 mm. To reduce the structural size of the entire device having large focal lengths, it is possible, for example, to use a mirror objective of the Cassegrain type with a negative intermediate lens instead of the objective 24 shown in FIG. 5.

The invention picture-taking system is employed advantageously in satellites for photographing the surfaces of the earth, of the moon, or of a planet. The fitting together of the individual picture series to form the complete picture can be effected solely by the inherent movement of the satellite in flying over the object to be photographed, or by rotation of the satellite about an axis parallel to the picture line, or by a combination of both possibilities. By so doing, the power of resolution can be increased substantially, as the effective velocity of the end point of the optical axis of the picture-taking system, conceived as prolonged, is reduced on the object. Also, the inherent movement of the satellite necessary for the fitting together of the individual picture lines can be replaced or substituted by a rotating mirror.

For surveying, and for clearer information of the overflown area, there may be arranged alternatively in a satellite two of the invention picture-taking systems, each of which photographs the area under a different respective angle. The angle between the optical axes of the two photography systems then is a measure of the relief of the stereo picture obtained, so that stereo photographs also can be taken from great heights.

While specific embodiments of the invention have been shown and described in detail to illustrate the application of the principles of the invention, it will be understood that the invention may be embodied otherwise without departing from such principles.

What is claimed is:

1. In a method for photographing an object from aboard an attitude-stabilized flying body flying over the object, by line-by-line reproduction of the object, using non-movable mechanical parts, on the photosensitive screen of electron beam scanning camera tubes: the improvement comprising providing an objective reproducing the object to be photographed in an image plane; masking out one line of the object reproduced in the image plane; analyzing the masked out line into plural line segments; and reproducing each line segment on the photosensitive screen of a respective camera tube.

2. In a method for photographing an object, the improvement claimed in claim 1, including dispersing each line segment to provide a plurality of spectral ranges which are successive partial spectral ranges of light in the visible and near infrared range, each spectral range being reproduced on a photosensitive screen of the associated camera tube; and scanning the reproduced ranges to produce a color photograph.

3. In a method for photographing an object, the improvement claimed in claim 1, including duplicating the method steps utilizing two objectives having optical axes extending at an angle to each other, whereby to produce stereo pictures of the object.

4. In a device for photographing an object, from aboard an attitude-stabilized flying body flying over the object, by line-by-line reproduction of the object, using non-movable mechanical parts, on the photosensitive screen of electron beam scanning camera tubes, the improvement comprising, in combination, an objective reproducing the object to be photographed in an image plane; plural mirror strips arranged in said image plane and extending transversely of the flight direction of the flying body, said mirror strips being gaplessly contiguous to each other and having respective perpendiculars thereto extending in respective different directions; said mirror strips masking out only one line of the object reproduced in the image plane and dividing the masked out line into plural line segments; and respective converging lens systems operatively associated with each mirror strip and reproducing each line segment on the photosensitive screen of the respective camera tube.

5. In a device for photographing an object, the improvement claimed in claim 4, comprising a respective dispersion optical element included in each converging lens system and dispersing light passing therethrough into a plurality of spectral ranges.

6. In a device for photographing an object, the improvement claimed in claim 4, including a number of prisms equal to the number of mirror strips; each mirror strip being applied on an area of a respective prism in a manner such that the long side of the mirror strip coincides with the edge of the prism.

7. In a device for photographing an object, the improvement claimed in claim 4, in which there are four mirror strips; a block formed with four recesses each having a respective camera tube mounted therein; said recesses being oriented in a manner such that the lines reproduced on the screens of the respective camera tubes are parallel to each other but perpendicular to the optical axis of said objective.

* * * * *